United States Patent
Igval et al.

(10) Patent No.: US 7,889,721 B2
(45) Date of Patent: Feb. 15, 2011

(54) SELECTING AN ADAPTOR MODE AND COMMUNICATING DATA BASED ON THE SELECTED ADAPTOR MODE

(75) Inventors: Jacob Igval, Newtown, PA (US);
Christopher J. Cotignola, Doylestown, PA (US); Dipak Patel, Hatboro, PA (US)

(73) Assignee: General Instrument Corporation, Horsham, PA (US)

( * ) Notice: Subject to any disclaimer, the term of this patent is extended or adjusted under 35 U.S.C. 154(b) by 43 days.

(21) Appl. No.: 12/250,300

(22) Filed: Oct. 13, 2008

(65) Prior Publication Data

US 2010/0091796 A1 Apr. 15, 2010

(51) Int. Cl.
*H04L 12/66* (2006.01)
(52) U.S. Cl. .................................. 370/352; 370/401
(58) Field of Classification Search ............. 370/252, 370/265, 490, 401
See application file for complete search history.

(56) References Cited

U.S. PATENT DOCUMENTS

| 6,588,015 | B1 | 7/2003 | Eyer et al. | |
|---|---|---|---|---|
| 7,020,488 | B1 | 3/2006 | Bleile et al. | |
| 7,283,585 | B2 * | 10/2007 | LeBlanc et al. | 375/222 |
| 7,443,837 | B2 * | 10/2008 | Aoyagi et al. | 370/352 |
| 2003/0154488 | A1 * | 8/2003 | Strater et al. | 725/95 |
| 2003/0231661 | A1 | 12/2003 | Depietro et al. | |
| 2004/0163129 | A1 * | 8/2004 | Chapman et al. | 725/126 |
| 2005/0265394 | A1 * | 12/2005 | Chapman et al. | 370/480 |
| 2006/0190245 | A1 * | 8/2006 | Iser et al. | 704/219 |
| 2008/0195383 | A1 * | 8/2008 | Shlomot et al. | 704/205 |

OTHER PUBLICATIONS

George S., "The Acceptance of Wideband Analog Telephony", Analog Zone, as downloaded Oct. 2007.
PCT Search Report & Written Opinion, RE: Application #PCT/US2009/058730 Nov. 24, 2009.

* cited by examiner

*Primary Examiner*—Ricky Ngo
*Assistant Examiner*—Dewanda Samuel
(74) *Attorney, Agent, or Firm*—Larry T. Cullen

(57) ABSTRACT

A device selects a mode and communicates data based on the selected mode. The device comprises at least one interface circuit configured to monitor analog audio signals from a customer premise equipment device and a processor circuit. The processor circuit assigns a first band mode for converting the analog audio signals to data packets if the analog audio signals do not have frequency components outside the first band of frequencies and assigns a second band mode for the conversion otherwise. The assignment of the second band mode for the conversion enables the output circuit to use a larger bandwidth of the communication channel to a network.

13 Claims, 3 Drawing Sheets

SELECTING AN ADAPTOR MODE AND COMMUNICATING DATA BASED ON THE SELECTED ADAPTOR MODE

CROSS-REFERENCES

This application is related to copending and commonly assigned Non-Provisional U.S. patent application Ser. No. 11/930,441, entitled "DYNAMIC ROUTING OF WIDEBAND AND NARROWBAND AUDIO DATA IN A MULTIMEDIA TERMINAL ADAPTER," filed by the same inventors to this instant patent application on Oct. 31, 2007, the disclosure of which is hereby incorporated by reference in its entirety.

BACKGROUND

Voice-over-Internet-Protocol (VoIP) communication between different VoIP devices have traditionally supported narrowband communications. For example, the G.711 standard, which is an ITU-T standard primarily used in telephony, has been used to conduct narrowband communications. Recently, more and more service providers have been requiring broadband channels in VoIP devices to support higher quality service in connecting phone calls. However, such requirement could not be efficiently met because a mechanism for efficiently assigning broadband connections among multiple telephone devices connected to a VoIP device has not been made available.

In explaining the background of the foregoing deficiency, a VoIP device such as an analog terminal adaptor (ATA), a multimedia terminal adaptor (MTA), an embedded MTA (EMTA), etc., enables users to make and receive telephone calls via a VoIP network such as the Internet by connecting a portable VoIP device to the VoIP network, where the VoIP device operates as an interface between a telephone and a VoIP network. As to the foregoing types of VoIP devices, an EMTA is a combination of a modem and an MTA. The term "MTA" refers to a VoIP device and is used interchangeably with an ATA. As referred to in this disclosure, a modem may be any reasonably suitable modem for receiving data such as a cable modem, digital subscriber line (DSL) modem, etc.

In describing the narrowband and the wideband of frequencies for analog audio signals more specifically, when a VoIP device converts analog audio signals from a telephone to data packets, the input audio signals may have either a narrowband of frequencies or a wideband of frequencies. As referred to in this disclosure and usually in telephony, analog audio signals are considered to have the narrowband of frequencies, if the analog audio signals does not have frequency components outside a range of 200 Hz to 3.4 kHz. On the other hand, analog audio signals are considered to have the wideband of frequencies if the analog audio signals have frequency components outside the range of 200 Hz to 3.4 kHz. For instance, the wideband of frequencies may encompass a frequency range from 50 Hz to 7 kHz, as opposed to the narrowband range of 200 Hz to 3.4 kHz. Typically, analog audio signals having the wideband of frequencies are reproduced into higher quality audio sounds (for instance, higher definition sounds) than sounds reproduced from analog audio signals having the narrowband of frequencies.

Analog audio signals produced by a telephone may have the narrowband of frequencies because of the characteristics of the audio sounds and/or the telephone generating the analog audio sounds. For example, audio sounds detected by a telephone may have no frequency components outside the narrowband of frequencies, and thus the telephone may generate analog audio signals having the narrowband of frequencies only. Alternatively, while audio sounds detected by a telephone device may have frequency components outside the narrowband of frequencies, the telephone device detecting the audio sounds may not be capable of generating analog audio signals having frequency components outside the narrowband of frequencies and thus generate analog audio signals having no frequency components outside the narrowband of frequencies.

As the popularity of wideband audio data increases, it is desirable to have the wideband audio services made available through VoIP devices. However, such desire could not be efficiently met because a mechanism for efficiently assigning broadband connections among multiple telephone devices connected to a VoIP device based on, for instance, whether there are wideband analog audio input signals to the VoIP device from a telephone in the first place has not been made available.

BRIEF DESCRIPTION OF THE DRAWINGS

The embodiments of the invention will be described in detail in the following description with reference to the following figures.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

As referred to in this disclosure, a VoIP device may be any reasonably suitable adaptor such as an ATA, MTA, EMTA, etc., that converts analog audio signals received from an audio port to data packets by at least adding header fields, outputs the converted data packets to a data packet port, converts data packets received from the data packet port to analog audio signals by at least stripping header fields from the data packets, and outputs the converted audio signals to the audio port. Another example of a VoIP device is a combination of an EMTA and a cordless base station, where the base station is used to send data received by the EMTA to a customer premise equipment (CPE) device such as a telephone, fax machine, a computer, a voice answering machine, etc., over one or more wireless communication channels. As referred to in this disclosure, data packets each comprise a header field and a data field, where the header fields are used for processing data packets and may each include at least one of a source Internet protocol (IP) address, a destination IP address, a time, and any other data related to processing of data packets including cyclic redundancy check (CRC) bits.

According to an embodiment, when a VoIP device converts analog audio signals from a CPE device to data packets, if the analog audio signals have the narrowband of frequencies, the VoIP device assigns the narrowband mode of operations to itself for converting the analog signals to the data packets, and, if the analog audio signals have the wideband of frequencies, the VoIP device assigns the wideband mode of operations to itself for the conversion. The wideband mode of the VoIP device enables the VoIP device to use a larger bandwidth than a bandwidth allowed with the assignment of the narrowband mode to the VoIP device in transmitting the data packets on a communication channel through a network.

By selectively assigning the wideband mode of operations for the VoIP device for converting analog audio signals to data packets after determining that the analog audio signals have the wideband of frequencies, resources within VoIP devices and the network may be conserved.

Figure 1:
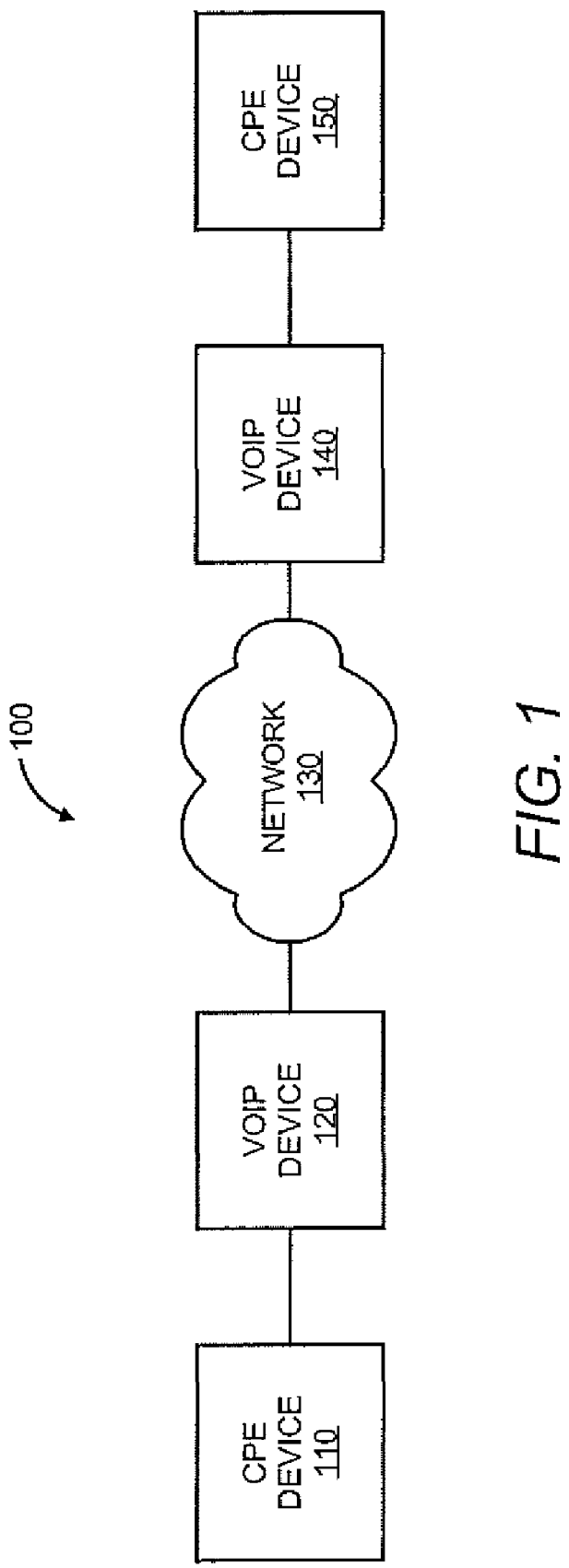
FIG. 1 illustrates a system for selectively assigning one of a narrowband mode or wideband mode of operations for converting analog audio signals from a CPE device to data packets, according to an embodiment of the invention.

FIG. 1 illustrates a system 100 for selectively assigning one of the narrowband mode or wideband mode of operations for converting analog audio signals from a CPE device 110 to data packets after determining that the analog audio signals have the narrowband of frequencies or the wideband of frequencies, respectively. It should be understood that the system 100 may include additional components and that some of the components described herein may be removed and/or modified without departing from a scope of the system 100. While embodiments are described in relation to the narrowband and wideband of frequencies, the same description regarding the narrowband and wideband of frequencies covers and extends to any other first and second bands of frequencies, where the second band of frequencies has a larger band of frequencies than the first band of frequencies.

The system 100 comprises the CPE device 110, a VoIP device 120, the network 130, a VoIP device 140, and a CPE device 150.

In describing the operations of the system 100 in connection with components of the system 100 more specifically, the CPE device 110 may be any reasonably suitable device for communicating analog audio signals such as a telephone, a computer, etc. Analog audio signals generated by the CPE device 110 may have the wideband of frequencies or the narrowband of frequencies. As described above, analog audio signals generated by the CPE device 110 may have the narrowband of frequencies because of the characteristics of audio sounds received by the CPE device 110 and/or characteristics of the CPE device 110. While one CPE device 110 is shown, multiple CPE devices 110 may communicate with the VoIP device 120 and may each transmit analog audio signals.

The VoIP device 120 monitors the analog audio signals, as being received by the VoIP device 120, and determines, based on the monitoring, whether the analog audio signals have the wideband of frequencies. As referred to in this disclosure, monitoring of signals (for example, analog audio signals or data packets) may refer to a constant or periodic determination whether the signals have the wideband of frequencies or correspond to input analog audio signals having the wideband of frequencies, where the determination is performed autonomously without any further input from a user to trigger such determination.

In response to a determination that the analog audio signals have the wideband of frequencies, the VoIP device 120 assigns a wideband mode of operations to itself for converting the analog audio signals to the data packets, where the conversion comprises the actual conversion and transmission of the data packets to the network 130. Alternatively, the assignment of the wideband mode of operations may additionally include assignment of the wideband mode for operations of the network 130 and/or the VoIP device 140 in processing the data packets.

In any case, the assignment may be unilaterally determined by the VoIP device 120 or collaboratively determined by the VoIP device 120, the network 130 and/or the VoIP device 140, where a codec for coding and decoding data packets between the VoIP device 120, the network 130 and/or the VoIP device 140 may be determined, exchanged, and used in communicating the data packets. For example, as a part of either a unilateral determination by the VoIP device 120 or collaborative determination by the VoIP device 120, the network 130 and/or the VoIP device 140 of the assignment of either the narrowband mode or wideband mode of operations for processing data packets corresponding to the analog audio signals, a determination that the VoIP device 120, the network 130 and/or the VoIP device 140 is not capable of handling an additional assignment of the wideband mode for the data packet processing may cause the assignment of the narrowband mode.

For example, such incapacity to handle an additional assignment of the wideband mode may arise if a total available bandwidth threshold of a communication channel in or between the VoIP device 120, the network 130 and/or the VoIP device 140 will be exceeded by the additional assignment. Alternatively, such incapacity to handle an additional assignment of the wideband mode may arise if a total number of available communication channels in or between the VoIP device 120, the network 130 and/or the VoIP device 140 will be exceeded by the additional assignment.

After the assignment of the wideband mode for converting analog audio signals from the CPE device 110 to data packets, the VoIP device 120 may change the assignment to the narrowband mode of operations if another device connected to the network 130 such as the VoIP device 140 and/or the network 130 determines from the data packets and informs the VoIP device 120 that the analog audio signals no longer have frequency components outside the first band of frequencies.

While only one CPE 110 is shown, if a plurality of CPE devices 110 are coupled to the VoIP device 120, the VoIP device 120 may have a multiple interface circuits. Each interface circuit is configured to monitor analog audio signals from a respective CPE device of the plurality of CPE device and determine whether the respective analog audio signals have frequency components outside the narrowband of frequencies. Based on the foregoing determination by the respective interface circuit of each CPE device 110, the VoIP device 120 may make, for each CPE device 110, the above-described determination of whether to assign the wideband mode of operations to itself in converting analog audio signals from the CPE device 110 to data packets.

The above-described operation of assigning an appropriate one of the narrowband mode and the wideband mode of operations for converting analog signals from a CPE device 110 to data packets may be performed from the onset of the communication from the CPE. Alternatively, the communication from the CPE 110 may be first established by assigning the narrowband mode of operations for the conversion. By using the narrowband mode of operations initially when the CPE device 110 first communicates to the VoIP device 120, the communication may be enabled without a delay since the narrowband mode of operations is universally supported by, for example, the VoIP device 120, the network 140 and the CPE device 150.

After the communication is first established by using the narrowband mode of operations, a determination may be made subsequently as to whether wideband analog audio signals are being received from the CPE device 110. If a determination is made that wideband analog audio signals are being received from the CPE device 110, the initial assignment of the narrowband mode of operations for converting the analog audio signals from the CPE device to data packets is changed to the wideband mode of operations by having a coordinated codec change between the VoIP device 120, the network 130 and/or the VoIP device 140. The change may occur whenever after the initial period since analog audio signals from the CPE device 110 are constantly monitored by the VoIP device 120.

Similarly, after the assignment of the wideband mode of operations for converting analog audio signals from a CPE device 110 to data packets, if the VoIP device 120, the network 130, and/or VoIP device 140 detects from the received analog audio signal or data packets that the analog audio signals no longer have frequency components outside the narrowband of frequencies, the assigned mode of operations may change to the narrowband mode of operations for the conversion by, for instance, having a coordinated codec change between the VoIP device 120, the network 130, and/or the VoIP device 140.

The network 130 may be any reasonably suitable network for communicating data packets between the VoIP devices 120 and 140. For instance, the network 130 may comprise one or more packet-switched networks such as the Internet. As described above, the network 130 may detect whether the VoIP device 120 is not outputting data packets corresponding to analog audio signals having the wideband of frequencies and cause an assignment of the broadband mode of operations to change to an assignment of the narrowband mode of operations. At any point during the operation of the VoIP device 120, the network 130 may indicate to the VoIP device 120 whether the network 130 is capable of handling an assignment of the wideband mode of operations for processing the data packets for a particular CPE device 110.

The VoIP device 140 may be any reasonably suitable adaptor for converting analog audio signals received at an analog port into data packets for being transmitted through a data packet port and/or converting data packets received at the data packet port into analog audio signals for being transmitted through the analog port. If the broadband mode has been assigned for converting data packets received from the network 130 to analog audio signals, the VoIP device 140 may operate in the broadband mode in converting the data packets received from the network 130 to analog voice signals having the broadband of frequencies for being transmitted to the CPE device 150. As described above, the VoIP device 140 may detect whether the VoIP device 120 is not outputting data packets corresponding to analog audio signals having the wideband of frequencies and cause an assignment of the broadband mode of operations to change to an assignment of the narrowband mode of operations. At any point during the operation of the VoIP device 120, the VoIP device 140 may indicate to the VoIP device 120 whether the VoIP device 140 is capable of handling an assignment of the wideband mode of operations in processing the data packets for a particular CPE device 110.

The CPE device 150 may be any reasonably suitable device for communicating analog audio signals such as a telephone, a fax machine, a computer, etc. The CPE device 150 may receive from the VoIP device 140 analog audio signals having the wideband or the narrowband of frequencies. When analog signals having the wideband of frequencies are received from the VoIP device 140, the CPE device 150 is able to reproduce higher quality audio sounds (for instance, higher definition sounds) than by using analog audio signals having the narrowband of frequencies. While one CPE device 110 is shown, multiple CPE devices 110 may communicate with the VoIP device 120 and may each transmit analog audio signals.

While the system 100 has been described above from the perspective of the CPE device 110 and the VoIP device 120 being on the input end of audio sounds and the CPE device 150 and the VoIP device 140 being on the output end of audio sounds, the roles may be reversed and/or both roles be performed in each component, in which case the above description of functions of the components on either ends is to be reversed or also apply to corresponding components on the other end.

Figure 2:
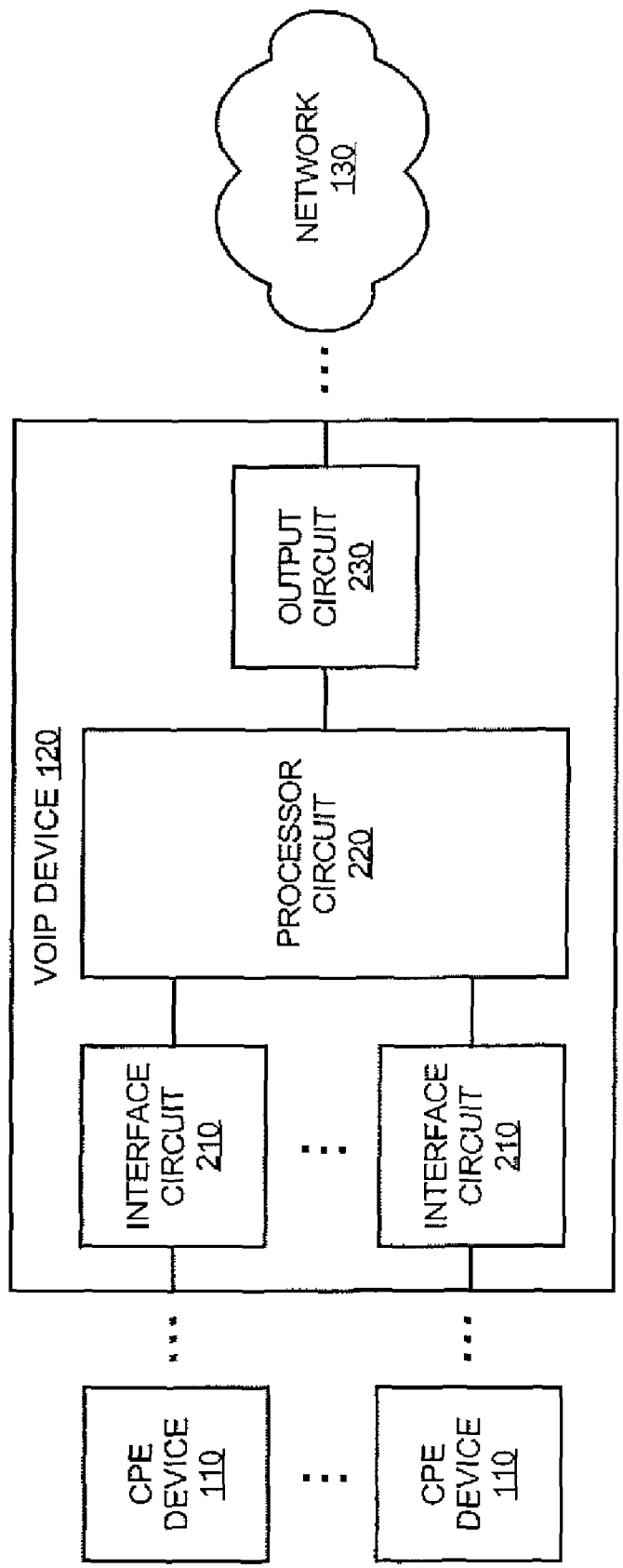
FIG. 2 illustrates a block diagram of a CPE device, according to an embodiment of the invention.

Now turning to FIG. 2, shown therein is a block diagram of the VoIP device 120, according to an embodiment. The VoIP device 120 comprises a plurality of interface circuits 210 receiving analog audio signals from a plurality of CPE devices 110, a processor 220, and an output circuit 230. It should be understood that the VoIP device 120 may include additional components and that some of the components described herein may be removed and/or modified without departing from a scope of the VoIP device 120. For example, while the interface circuits 210, the processor 220, and the output circuit 230 are shown as separate components of the VoIP device 120, different component configurations may also be used and any one or more functions of any one or more components may be replaced by functions in other components. Further, the components of the VoIP device 120 may be in a single housing or in multiple housings.

Each interface circuit 210 is configured to monitor frequency components of analog audio signals generated by a respective CPE device 110 of the plurality of CPE devices 110 and determines, based on the monitoring, whether the analog audio signals have the wideband of frequencies.

The processor circuit 220 uses the determination by the interface circuit 210 on whether analog audio signals of the respective CPE device 110 of the interface circuit 210 have the wideband of frequencies and performs any one or more above-described functions of the VoIP device 120 in selectively assigning one of the wideband mode and the narrowband mode of operations and performing a conversion of analog audio signals from the CPE device 110 to data packets.

The output circuit 230 may be any reasonably suitable circuit for receiving the data packets from the processor 220 and communicating the data packets to the network 130 such as a cable modem, DSL modem, etc.

Figure 3:
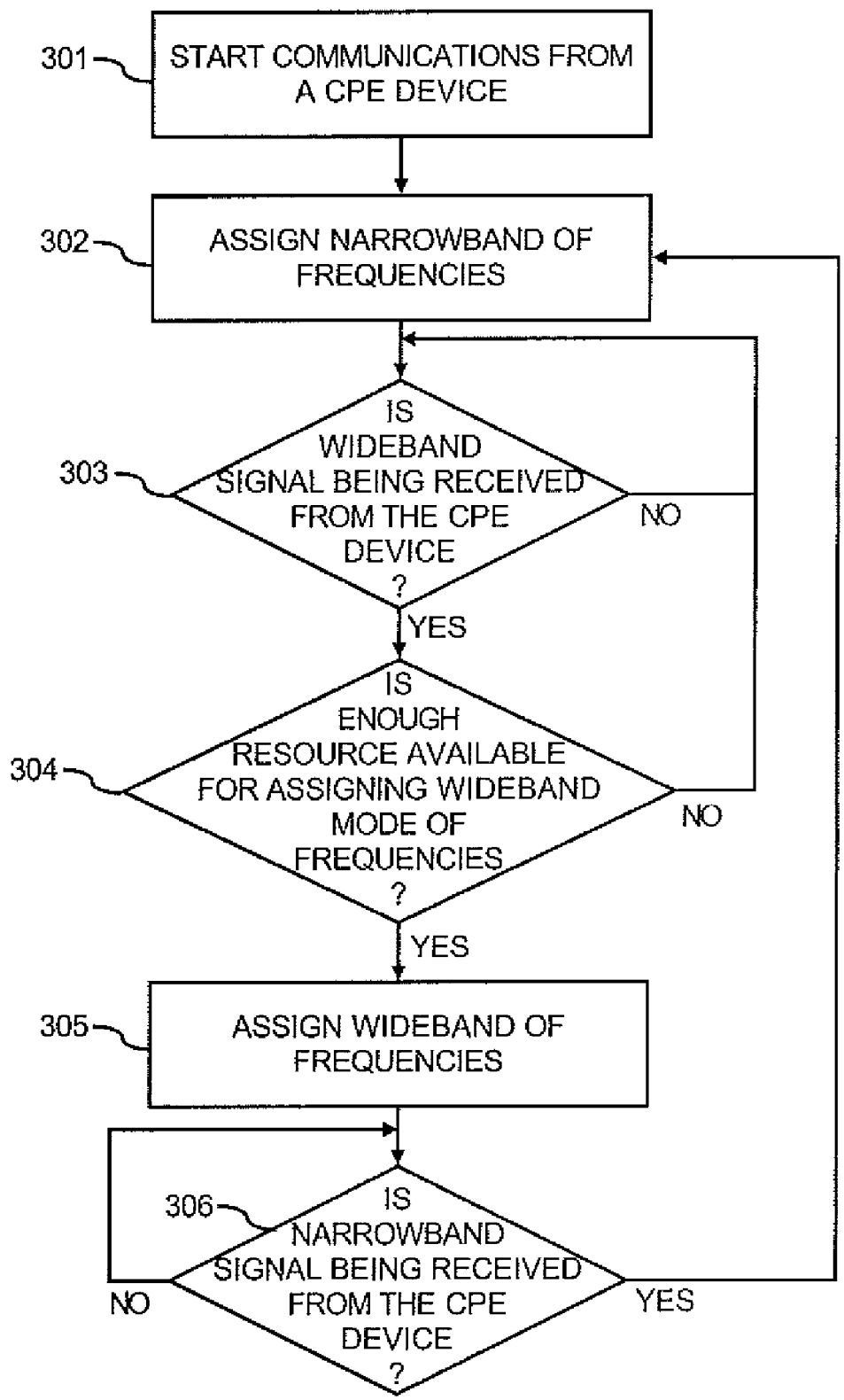
FIG. 3 illustrates a flow-chart of a method for selectively assigning one of a narrowband mode or wideband mode of operations for converting analog audio signals from a CPE device, according to an embodiment of the invention.

Turning now to FIG. 3, shown therein is a flow-chart of a method 300 for selectively assigning one of the narrowband mode or wideband mode of operations for converting analog audio signals from a CPE device 110 to data packets, according to an embodiment. It should be apparent to those of ordinary skill in the art that other steps may be added or existing steps may be removed, modified or rearranged without departing from a scope of the method 300.

At step 301, communications from a CPE device 110 is started.

At step 302, the narrowband of frequencies is assigned to the communications from the CPE device 110.

At step 303, a determination is made, for example by the VoIP device 120, whether the CPE device 110 is generating analog audio signals having the wideband of frequencies. If the answer is "no," the step 303 is repeated at a next sampling period of the analog audio signals.

At step 304, if the CPE device 110 is generating analog audio signal having the wideband of frequencies, a determination is made whether enough resource is available for assigning the wideband mode of operations in, for example, the VoIP device 120, the network 130, and/or the VoIP device 140. If the answer is no, the step 303 is performed at the next sampling period of the analog audio signals.

At step 305, if enough resource is available for assigning the wideband mode of operations, the wideband mode of operations is assigned for processing the communications from the CPE device 110 at, for instance, the VoIP device 120.

At step 306, a determination is made, for instance, by the VoIP device 120, whether the CPE device 110 is generating analog audio signals having the narrowband of frequencies. If the answer is "yes," the step 302 is performed, and the narrowband of frequencies is assigned for processing the communications from the CPE device 110. Otherwise, the step 306 is repeated at the next sampling period of the analog audio signals.

By selectively assigning the narrowband mode or the wideband mode of operations for the VoIP device 120 for processing data packets corresponding to analog audio signals based on a determination that the analog audio signals have the narrowband or the wideband of frequencies, respectively, resources of the VoIP device 120, the network 130, and/or the VoIP device 140 may be efficiently managed and saved.

Any one or more of the above-described operations of selectively assigning the narrowband mode or the wideband mode of operations for processing data packets corresponding to analog audio signals based on a determination that the analog audio signals have the narrowband or the wideband of frequencies and any one or more of the above-discussed other factors in reference to exemplary features and embodiments of FIGS. 1-3 may be contained as a computer program product embodied on one or more tangible, computer readable storage mediums. The computer program product may exist in a variety of forms both active and inactive. For example, the computer program product may exist as software program(s) comprised of program instructions in source code, object code, executable code or other formats whether compressed or uncompressed.

Exemplary tangible, computer readable mediums include conventional computer system RAM, ROM, EPROM, EEPROM, and magnetic or optical disks or tapes. Concrete examples of the foregoing include distribution of the programs on a CD ROM or via Internet download. In a sense, the Internet itself, as an abstract entity, is a computer readable medium. The same is true of computer networks in general.

While exemplary features and embodiments of FIGS. 1-3 have been explained within the context of each feature and embodiment, any one or more of the exemplary features and embodiments of the invention may be applied and is incorporated in any and all of the embodiments of the invention unless clearly contradictory.

While the embodiments have been described with reference to examples, those skilled in the art will be able to make various modifications to the described embodiments without departing from the scope of the claimed embodiments.

What is claimed is:

1. A Voice over Internet Protocol (VoIP) device for selecting a mode and communicating data based on the selected mode, the device comprising:
at least one interface circuit, each interface circuit configured to monitor analog audio signals from one or more customer premise equipment device(s) during a communication to determine monitored frequency components of the analog audio signals from the corresponding customer premises equipment(s), and determine whether the monitored frequency components are outside a first band of frequencies;
a processor circuit coupled to the at least one interface circuit and configured to:
assign a first band mode for converting the analog audio signals to data packets during portions of the communication when none of frequency components monitored by the at least one interface circuit are outside the first band of frequencies, wherein each data packet comprises a header field and a data field;
assign a second band mode for the conversion during portions of the communication when any one or more of the frequency components monitored by the at least one interface circuit are outside the first band of frequencies; and
convert the analog audio signals to data packets by using the assigned one of the second and first band modes; and
an output circuit coupled to the processor circuit and configured to receive and transmit the data packets through a communication channel to a network, wherein the assignment of the second band mode for the conversion enables the output circuit to use a larger bandwidth of the communication channel to the network than a bandwidth allowed by the assignment of the first band mode for the conversion in transmitting the data packets through the communication channel.

2. The Voice over Internet Protocol (VoIP) device of claim 1, wherein the Voice over Internet Protocol (VoIP) device is a multimedia terminal adaptor, and wherein the first band of frequencies comprises a frequency range of 200 Hz to 3.4 kHz, and wherein at least one of the at least one customer premise equipment devices is a telephone.

3. The device of claim 1, wherein the processor circuit is further configured to, after the assignment of the second band mode for the conversion, subsequently change the assignment to the first band mode in response to a communication from another device connected to the network indicating that the other adaptor has determined from the transmitted data packets that the analog audio signals no longer have frequency components outside the first band of frequencies.

4. A method used in a Voice over Internet Protocol (VoIP) device for selecting an adaptor mode and communicating data based on the selected adaptor mode, the method comprising:
monitoring analog audio signals from at least one customer premise equipment device during a communication to determine monitored frequency components of the analog audio signals;
determining during the communication whether the monitored frequency components are outside a first band of frequencies;
assigning a first band mode to an adaptor for converting the analog audio signals to data packets during portions of the communication when none of the monitored frequency components are outside the first band of frequencies, wherein each data packet comprises a header field and a data field;
assigning a second band mode to the adaptor for the conversion during portions of the communication when the monitored frequency components are outside the first band of frequencies, wherein the assignment of the second band mode enables the adaptor to use a larger bandwidth of a communication channel to a network than a bandwidth allowed by the assignment of the first band mode for the conversion in transmitting the data packets on the communication channel; and
transmitting the data packets through the communication channel to the network by using the adaptor.

5. The method of claim 4, further comprising, after the assignment of the second band mode for the conversion, subsequently changing the assignment to the first band mode in response to a communication from another adaptor connected to the network that indicates that the other adaptor has determined from the transmitted data packets that the analog audio signals no longer have frequency components outside the first band of frequencies.

6. The method of claim 4, wherein assigning a second band mode for the conversion is performed only when a total available bandwidth threshold of the communication channel is not being exceeded by the assignment of the second band mode for the conversion.

7. The method of claim 4, further comprising assigning the first band mode for the conversion when the communication is initiated.

8. The method of claim 4, wherein determining whether the monitored frequency components are outside a first band of frequencies comprises periodically determining whether the monitored frequency components are outside the first band of frequencies.

9. A computer program product embodied on one or more tangible computer readable storage mediums that are each one of a machine or manufacture, the computer program for selecting a mode and communicating data based on the selected mode, the computer program product comprising instructions for:

monitoring analog audio signals from at least one customer premise equipment device during a communication to determine monitored frequency components of the analog audio signals;

determining during the communication whether the monitored frequency components are outside a first band of frequencies;

assigning a first band mode to an adaptor for converting the analog audio signals to data packets during portions of the communication when none of the monitored frequency components are outside the first band of frequencies, wherein each data packet comprises a header field and a data field;

assigning a second band mode to the adaptor for the conversion during portions of the communication when the monitored frequency components are outside the first band of frequencies, wherein the assignment of the second band mode enables the adaptor to use a larger bandwidth of a communication channel to a network than a bandwidth allowed by the assignment of the first band mode for the conversion in transmitting the data packets on the communication channel; and transmitting the data packets through the communication channel to the network by using the adaptor.

10. The computer product of claim 9, further comprising instructions for:

after the assignment of the second band mode for the conversion, subsequently changing the assignment to the first band mode in response to a communication from another adaptor connected to the network that indicates that the other adaptor has determined from the transmitted data packets that the analog audio signals no longer have frequency components outside the first band of frequencies.

11. The Voice over Internet Protocol (VoIP) device according to claim 1, wherein the monitoring is performed at sampling periods of the analog audio signals.

12. The method according to claim 4, wherein the monitoring is performed at sampling periods of the analog audio signals.

13. The computer program product according to claim 9, wherein the monitoring is performed at sampling periods of the analog audio signals.

* * * * *